US012628987B2

(12) United States Patent
Debonte et al.

(10) Patent No.: US 12,628,987 B2
(45) Date of Patent: May 19, 2026

(54) POINT-OF-USE FRYING OIL MONITORING AND BLENDING

(71) Applicant: Cargill, Incorporated, Wayzata, MN (US)

(72) Inventors: Lorin Roger Debonte, Eden Prairie, MN (US); Diliara Iassonova, Maple Grove, MN (US); Anil Bhagwan Khare, Minnetonka, MN (US); Jody Longshore, Wayzata, MN (US); Jeffrey J. Malsam, Excelsior, MN (US); Kyle Robert Marinkovich, Minnetonka, MN (US)

(73) Assignee: Cargill, Incorporated, Wayzata, MN (US)

( * ) Notice: Subject to any disclaimer, the term of this patent is extended or adjusted under 35 U.S.C. 154(b) by 1124 days.

(21) Appl. No.: 17/435,753

(22) PCT Filed: Mar. 4, 2020

(86) PCT No.: PCT/US2020/020903
§ 371 (c)(1),
(2) Date: Sep. 2, 2021

(87) PCT Pub. No.: WO2020/180936
PCT Pub. Date: Sep. 10, 2020

(65) Prior Publication Data
US 2022/0151437 A1 May 19, 2022

Related U.S. Application Data

(60) Provisional application No. 62/909,346, filed on Oct. 2, 2019, provisional application No. 62/813,990, filed on Mar. 5, 2019.

(51) Int. Cl.
*A47J 37/12* (2006.01)

(52) U.S. Cl.
CPC .................................. *A47J 37/1266* (2013.01)

(58) Field of Classification Search
CPC ............... A47J 37/1266; A47J 37/1271; Y10T 137/85978
See application file for complete search history.

(56) References Cited

U.S. PATENT DOCUMENTS 4,580,699 A * 4/1986 Black ...................... B01F 35/88
222/64
4,826,590 A 5/1989 Turman
7,309,422 B2 12/2007 Mullaney, Jr.
(Continued)

FOREIGN PATENT DOCUMENTS

WO 9222236 W 12/1992

*Primary Examiner* — Tiffany T Tran

(57) ABSTRACT

A frying oil system (100) generally includes a frying vat (108A) having a frying oil contained therein. The frying vat (108A) can be supplied by two or more oil reservoirs (104A, 104N), such as to establish a desired oil blend of different oils from the two or more oil reservoirs (104A, 104N). A sensor (124A) can be used to provide data indicative of a characteristic of in the frying vat (108A). Establishing the blend can include automatic control taking into account data obtained from a sensor configured to receive sensing information relating to one or more attributes of the frying oil in the frying vat (108A).

16 Claims, 5 Drawing Sheets

(56)         References Cited

U.S. PATENT DOCUMENTS

| | | | |
|---|---|---|---|
| 2009/0252842 A1* | 10/2009 | Wang | A47J 37/1271 426/244 |
| 2010/0326288 A1* | 12/2010 | Tiszai | F04B 41/02 137/553 |
| 2011/0168282 A1* | 7/2011 | Mitropoulos | A47J 37/1271 137/565.01 |
| 2015/0201808 A1* | 7/2015 | Katsuki | A23N 1/02 241/199.12 |
| 2015/0225224 A1* | 8/2015 | Tilton | G06Q 30/0631 705/26.7 |
| 2016/0033463 A1* | 2/2016 | Robertson | A47J 37/1223 99/330 |
| 2016/0102618 A1* | 4/2016 | Payne | F02D 41/0025 123/575 |
| 2021/0123784 A1* | 4/2021 | Schwach | G01J 5/0037 |

* cited by examiner

300

305 — RECEIVE DATA INDICATIVE OF CHARACTERISTIC OF FRYING OIL AS MEASURED BY SENSOR

320 — SELECT BLEND COMPOSITION

330 — ESTABLISH SPECIFIED BLEND

310 — CONTROL DELIVERY OF FIRST OIL FROM FIRST RESERVOIR

315 — CONTROL DELIVERY OF SECOND OIL FROM SECOND RESERVOIR

325 — MONITOR BLEND COMPOSITION

POINT-OF-USE FRYING OIL MONITORING AND BLENDING

CROSS REFERENCE TO RELATED APPLICATIONS

This application is a national phase application of PCT/US2020/020903, filed 4 Mar. 2020, which claims the benefit of U.S. Provisional Application No. 62/813,990, filed 5 Mar. 2019, and U.S. Provisional Application No. 62/909,346, filed 2 Oct. 2019, which are hereby incorporated by reference in their entirety.

FIELD OF THE DISCLOSURE

This document pertains generally, but not by way of limitation, to the field of cooking methods, systems and apparatus that enable the frying of edible food products in a frying oil.

BACKGROUND

Fried food offerings—including but not limited to French fries, chicken nuggets, chicken patties, fish patties, onion rings, cheese curds, vegetable protein patties, and other such offerings—are a staple of quick-serve restaurants and concessionaires, and of many traditional dining establishments. Oil management is a challenge that faces operators seeking to provide to their customers fried food having consistent quality. A wide range of frying oils are available having a range of frying properties. Generally, a frying equipment operator chooses a particular frying oil for a particular fried product or use, or relies upon a frying oil provider to provide a predetermined frying oil composition at delivery. For example, replenishment of oil within frying equipment, along with selection of a particular frying oil may generally be performed manually.

SUMMARY OF THE DISCLOSURE

Various "open loop" schemes may be used by frying equipment operators or service providers to carry out management of frying oil. As mentioned above, such management might include logistics relating to procurement and storage of fresh oil stock, dispensing of fresh oil into individual frying stations, filtering of frying oil after some duration of use, and removal of oil from use, including management of related storage and disposal. In the simplest scheme, such management might include ordering a fixed volume of replacement oils comprising different types of oil, such as on a periodic basis, and initiating operations such as fryer cleaning, oil filtering, or oil replacement based exclusively on attributes such as absolute oil age, duration of use at frying temperature, a count of "drops" of a frying basket, or the type of food being prepared. Top-off may be initiated in response to volumetric loss of oil (or determined by weight) over a duration of frying drops.

The present inventors have realized, among other things, that a point-of-use blending scheme can be beneficial to providing frying oil having desired characteristics, such as in response to changing consumption or demand patterns, or to maintain a consistent quality of fried food. For example, a specified oil blend may be formulated on-site at a restaurant or concession establishment, such as established automatically in part using data sensed from a frying apparatus or in response to other attribute data. For example, apparatus and techniques as described herein can allow oil blends to be established at the point-of-use that can be adapted to the particular needs to the operator.

Such blending techniques can be used to facilitate one or more of enhancing oil quality, preservation of oil quality over a longer duration as compared to other approaches, managing the cost of frying, or modification of the blend in relation to changing oil demand (e.g., due to volume of traffic or type of food). A sensor can be used at least in part to monitor one or more oil characteristics, such as to aid in control of an oil blending scheme. Edible oils used for frying may also be subject to an end-use monitoring regime (e.g., subject to regulatory requirements), and such requirements may be specific to particular geographic locales. Such a sensor can be arranged to monitor a characteristic of a blend of oils at a manifold or other location where the oils are blended, or oil from a frying vat to which blended oils are dispensed.

As an illustrative example, a blend established using the techniques described herein can include a combination of premium oil along with a lower cost oil, such as to provide consistent food product quality. In another example, the blends can be adjusted to reduce the oil break-in time to deliver full flavor of the oil. In another example, respective blends can be established for different food products that otherwise would involve the operator pre-ordering such blends pre-mixed from a provider and manually initiating change-outs or top-offs of respective frying oil vats at respective frying stations. The apparatus and techniques described herein can be used with as few as two different oil reservoirs as sources, and with as few as a single frying vat. In another example, the apparatus and techniques described herein can be used to manage oil blending to support multiple frying vats at a site, such as having point-of-use blending to establish respective (e.g., different) blends for different frying vats.

In an example, a frying oil system can include a frying vat having a frying oil contained within the frying vat, a plurality of frying oil reservoirs including at least a first frying oil in a first frying oil reservoir and a second frying oil in a second frying oil reservoir, each of the plurality of frying oil reservoirs capable of selectively delivering the frying oil to the frying vat, a sensor configured to receive sensing information relating to one or more attributes of the frying oil in the frying vat, and a control system configured to receive the sensing information from the sensor and, based at least upon the sensing information, determining a desired oil blend of the first frying oil and the second frying oil to be added to the frying vat, and selectively delivering the desired blend of the first frying oil from the first frying oil reservoir and the second frying oil from the second frying oil reservoir to the frying vat. For example, respective blends can be established at least in part in response to received data indicative of at least one attribute from a list including a time of day, a time of week, a time of month, a time of year, a duration since last oil replacement, a duration since last oil filtration, or a duration since a last fryer cleaning, as illustrative examples.

In an example, a technique such as an automated method can include controlling delivery of edible oil from two or more reservoirs to a frying vat, the method including receiving data indicative of a characteristic of frying oil in the frying vat as measured by a sensor, and in response to the data indicative of the characteristic, controlling delivery of first oil from a first reservoir amongst the two or more reservoirs and controlling delivery of a second oil from a second reservoir amongst the two or more reservoirs to adjust the characteristic using the first oil and the second oil to establish a specified blend. For example, controlling delivery of first oil from the first reservoir amongst the two or more reservoirs and controlling delivery of the second oil from a second reservoir amongst the two or more reservoirs can include receiving an input from a user.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
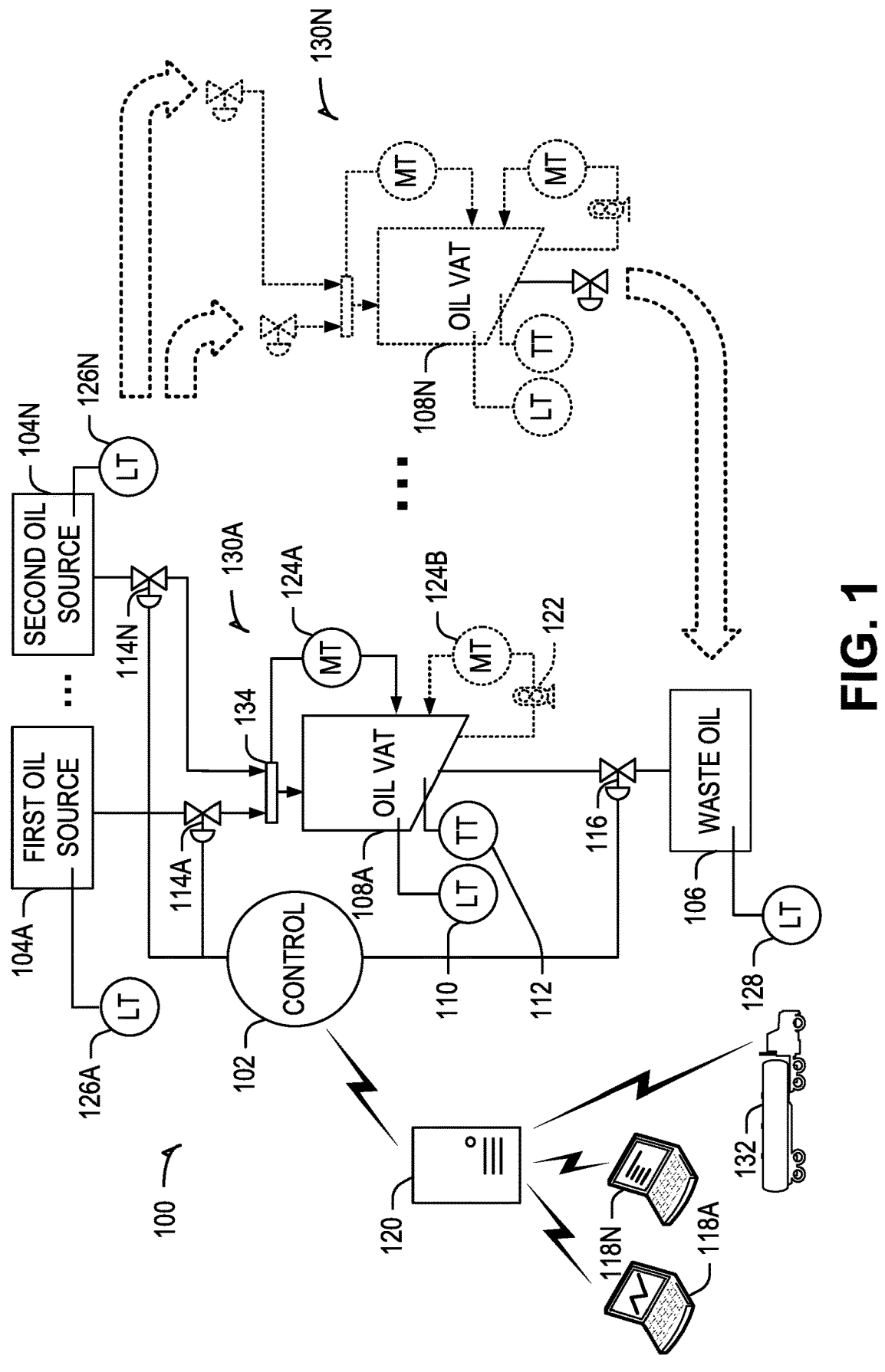
FIG. 1 illustrates generally an example showing a system that can include an oil reservoir such as a vat in a frying apparatus.

As mentioned above, different edible oils can be blended at a point-of-use, such as generally on-site at a restaurant or quick-serve establishment, or at the specific location of a frying apparatus. The apparatus and techniques described herein can be used to provide or maintain a blended oil composition that meets desired performance objectives. The apparatus and techniques described herein can be implemented as a portion of a stand-alone frying system or can be added to or otherwise interfaced with existing frying systems.

Generally, the apparatus and techniques described herein can be used to perform one or more of dynamic blending or static blending of edible oils. For example, the present subject matter can include a static blending approach wherein a specified blend composition is established comprising a fixed ratio of oils (specified by mass or by volume) supplied from respective frying oil reservoirs. In a dynamic blending approach, such a ratio or selected oils can be varied on-the-fly, such as in response to data provided by a sensor, such as to establish or maintain a desired blend. By way of example, a premium oil may be blended with a stock oil during times of high frying volume to enhance or maintain food quality from the frying process. Use of the premium oil in combination with the stock oil can help to offset or suppress a degradation in the stock oil. In another example, the present subject matter can include use of a manually-selected blend composition. The relative fraction or proportion of each oil can be controlled using a valve position or a duration of a valve being open or a valve being closed, as illustrative examples.

For example, an operator can manually determine a blend composition, such as by selecting a blend ratio between reservoirs or by manually opening and closing, or partially opening and closing, valves for respective reservoirs. Such opening or closing, or establishing a specified blend composition can include a semi-automated scheme wherein a user enters desired mass or volume proportions into a user interface, or selects amongst pre-selected blend options. In response, a control receives the input and controls one or more valves to top-off or otherwise dispense oil into a vat or blending reservoir. One or more specified blend compositions can be pre-set, such that respective frying systems may have corresponding specified blend compositions (e.g., a first frying system is assigned a first specified blend composition, and a second frying system at the same site is assigned a different second specified blend composition). An operator is then able to have multiple blends in use, such as dictated (e.g., controlled) according to a type of food to be prepared or in anticipation of demand for a particular food. Other examples include a closed-loop scheme that monitors data indicative of an oil characteristic and provides a specified blend in response or otherwise controls delivery of oil to a frying vat, where the oil is selected from two or more oil sources.

FIG. 1 illustrates generally an example showing a system 100 that can include an oil reservoir such as a vat 108 in a frying apparatus 130A. The system 100 can include or can be fluidically coupled with at least two oil sources (e.g., reservoirs), such as a first oil source 104A and a second oil source 104N. In this manner, a specified blend of frying oil can be provided for use in the vat 108. The vat 108 can be selectively fluidically coupled with the first and second oil sources 104A and 104N in manner where such sources are dedicated to the vat 108, or such sources 104A through 104N can be shared amongst multiple vats (e.g., shared amongst a frying apparatus 130A and another frying apparatus 130N having a respective vat 108N). The reservoirs 104A and 104N can have different respective oil types, such as to dispense frying oil through respective valves 114A and 114N to a blending apparatus such as a manifold 134, to provide a specified oil blend to the vat 108A, such as manually in response to a user input, or automatically under the direction of a control system (e.g., controller 102). The controller 102 may be shared across one or more fryers such as shown as frying apparatus 130A through 130N.

The first and second oil sources 104A and 104N can include tanks or other types of reservoirs. For example, oil may be delivered or handled in a jug-in-a-box (JIB) unit that can be fluidly connected to the fryer system to act as a frying oil reservoir. It shall be understood that reference to JIBs throughout also encompass any type of bulk tank used to store oil. A plurality of oil sources 104A through 104N can correspond to a plurality of JIBS acting as respective frying oil reservoirs. Respective JIBs may contain a different frying oil or any count of JIBS may contain the same frying oil or frying oil blend. Any count of JIBs may be connected to the system 100 to act as a frying oil reservoir. JIBs may include different dimensions or volumes depending on a type of frying oil or other frying component contained in the JIB. An anticipated volume of such frying oil or frying component may be used in part to specify a dimension or volume of a particular JIB. As an example, a relatively larger JIB may contain a base frying oil anticipated to be used as a primary frying oil. A second JIB may be smaller in size and may contain, for example, an additive to be blended with the frying oil from the first JIB (such as periodically or otherwise in a controlled manner). Generally, any combination of JIBs with different JIB sizes can be supported depending on the desired blend composition.

As shown illustratively in FIG. 1, the first and second oil sources 104A and 104N can be in fluid communication with a manifold 134 such as through respective valves 114A and 114N. Use of a single manifold 134 allows blending of different amounts of oil, such as in response to control signals provided to the valves 114A and 114N by the controller. Alternatively, or in addition, a blending reservoir or other manifolds can be included, such as to house specified oil blends separately from the manifold 134 associated with the oil vat 108A. A valve can be included between the manifold 134 and the oil vat 108A, such as to allow top-off or dispensing of blended oil into the oil vat 108A without requiring contemporaneous opening of valves 114A or 114N.

In the system 100 of FIG. 1, one or more sensors can be included to provide data indicative of a characteristic of frying oil, such as from acquired by a sensor monitoring one or more of a blending apparatus (e.g., manifold 134) or oil from the oil vat 108A. For example, the controller 102 can receive sensed data from a sensor, and based at least in part upon the sensed data, determine a desired oil blend of the first frying oil (e.g., from the first oil source 104A) and the second frying oil (e.g., from the second oil source 104N) to be added to the frying vat 108A. This can include selectively delivering the desired blend of the first frying oil from the first frying oil source 104A and the second frying oil from the second frying oil source 104N to the frying vat through the manifold 134.

Edible oil in use in the frying apparatus 130A may be monitored using an oil temperature sensor 112 (e.g., a temperature transmitter) or an oil level sensor 110 (e.g., a level transmitter). The oil temperature sensor 112 and the oil level sensor 110 may be communicatively coupled to the controller 102, such as to regulate one or more of an oil level or an oil temperature associated with the oil vat 108A, such as using the controller 102 or a separate controller. Such temperature or level monitoring can also be used to provide data indicative of duration-at-temperature or volume loss to aid in controlling dispense of a specified oil blend according to such attribute data.

As mentioned elsewhere herein, one or more other characteristics of an edible oil used in the frying apparatus 130A may be monitored. For example, in one approach, go/no-go monitoring may be performed using chemical test strips or a hand-held electronic testing device, such as to provide an indication of one or more oil characteristics indicative of oil degradation. Such test strips or the hand-held electronic device can provide a value that can be manually compared with a limit, and edible oil located in the oil vat 108A can be filtered or replaced based on such a comparison, such as using a specified blend of oils provided from the first and second oil sources 104A and 104N.

Generally, the system 100 shown in FIG. 1 can provide a semi-automated or fully-automated management scheme for edible oil used by the frying apparatus 130A including point-of-use blending. For example, the system 100 may include a sensor (e.g., one or more of a measurement transmitter 124A to monitor an oil blend from the manifold 132 or a measurement transmitter 124B to monitor oil from the oil vat 108A). The measurement transmitter 124A or the measurement transmitter 124B can be communicatively coupled with the controller 102 or other portions of the system 100, such as to provide data indicative of a characteristic of the edible oil used by the frying apparatus 130A to the controller 102.

As shown in FIG. 1, the measurement transmitter 124B may be in fluidic communication with the oil vat 108, such as through a measurement loop fed by a circulating pump 122. Other configurations may be used, such as including the measurement transmitter 124B as a portion of a filtration loop or placing the measurement transmitter 124B in a location to observe oil in the oil vat 108A directly. As shown in FIG. 1, the measurement transmitter 124A is arranged to monitor a characteristic of an oil blend established by the controller 102 from a blending apparatus (e.g., a manifold), and the measurement transmitter 124A could be located elsewhere such as in fluid communication with a blending reservoir or another manifold.

The controller 102 may implement an oil-management scheme such as using information obtained from the measurement transmitters 124A or 124B, along with one or more other attributes (such as oil level, oil temperature, trends in oil level or temperature, or attribute information concerning past, present, or future operations).

Various elements of the system 100 may be communicatively coupled to each other, such as via a wired or wireless link. The wireless communication may be established according to a wireless communication standard such as Bluetooth® (e.g., Bluetooth® Low Energy (BLE) as described in the Bluetooth Core Specification, v. 5.0, published Dec. 6, 2016, by the Bluetooth® Special Interest Group, Kirkland, Wash.) or according to one or more other standards (e.g., the Institute of Electrical and Electronics Engineers (IEEE) 802.11 family of standards known as Wi-Fi®, mobile communications standards such as relating to 4G/Long Term Evolution (LTE), or the IEEE 802.15.4 family of standards, as illustrative examples). The controller 102 may be communicatively coupled to other portions of the system 100 such as a data processing system 120 (e.g., an on-site server or site-wide control system, or a remote system such as a cloud-based management system, as illustrative examples). The data processing system 120 may be used to receive attribute information concerning historical, present, or future operations.

In another example, such as shown illustratively in FIG. 1, the controller 102 may be communicatively coupled to one or more valves, such as fresh oil supply valves 114A through 114N or an oil drain valve 116. The controller 102 may open one or more of the oil supply valves 114A through 114N or the oil drain valve 116 on a controlled basis, such as in response to measured data provided by sensors such as the measurement transmitters 124A or 124B, or in response to other triggers such as indicated by an oil stability or degradation metric. Such a metric can be indicative of a present state of oil in the oil vat 108A or a predicted future state.

Oil sources 104A through 104N, such as fresh oil reservoirs comprising respective JIBs or groups of JIBs, may be monitored by respective level sensors 126A through 126N. Similarly, a waste oil 106 level may be monitored by a level sensor 128. One or more of the level sensors 126A through 126N or the level sensor 128 may be communicatively coupled to the controller 102 or the data processing system 120.

In response to one or more of sensed information, present oil-stability or degradation metrics, or predicted future metrics, the data processing system 120 or other portions of the system 100 may trigger replenishment of the oil sources 104A through 104N, disposal of waste oil 106, or both. For example, a request or dispatch of fleet 132 oil delivery or disposal may be triggered in response to such monitoring or prediction. As an illustrative example, if a present or predicted oil consumption is trending higher, the data processing system 120 may generate or modify forecasting of fresh oil demand or waste oil generation for use in planning or dispatch of fleet oil supply or disposal resources. In an example, historical data such as indicative of time of day, time of month, time of year, holidays or times relative to holidays, or seasonal information can be provided as attribute information, or such information can be logged in relation to other indicia of oil degradation for use in the future, such as to provide predictive capability for the controller 102.

Attribute information in addition to sensed information provided by the measurement transmitters 124A or 124B may be stored in the controller 102. Such attribute information may be received from one or more operator interfaces (e.g., client machines 118A or 118N, such as computers, tablets, laptops, or fixed operator terminals having a display and input device). As discussed below in FIG. 2, attribute information may include specific attribute data concerning the oil (e.g., temperature, volume), the frying apparatus 130A, food attributes, store attributes, or operator attributes. The data processing system 120 may implement an expanded analysis or control scheme, and the controller 102 may be configured to implement a simplified instantiation of a control scheme for use in management of edible oil in the frying apparatus 130A.

According to various examples, the controller 102 may trigger actions involving operator intervention (e.g., notifications to one or more of add oil to the frying vat or replenish JIBs, remove oil from the oil vat or oil sources 104A through 104N, filter oil in the vat 108A, or replace oil in the vat 108A, or inhibit (e.g., lockout) frying apparatus from use), or the controller 102 may automatically perform one or more such actions. In an example, as described elsewhere herein, the controller 102 may modify one or more operational conditions such as to maintain the oil quality in the frying vat 108A, such as in a closed-loop manner (e.g., real-time or near-real-time). Use of the phrase "real-time" does not require millisecond-level response time, and generally refers to use of a closed-loop scheme in which one or more sensors such as measurement transmitters 124A or 124B provide data indicative of an oil characteristic that is then used to trigger one or more actions as mentioned above, at least including providing a specified oil blend to the oil vat 108A.

As mentioned above, the levels of the first and second oil sources 104A and 104N can be communicatively coupled to an oil inventory management system (such as provided by the data processing system 120). Such an inventory management system can receive information indicative of consumed oil volume, volume change, or anticipated demand, or such a system can be used for identifying an oil ordering context based upon various parameters. and in response, the system 120 can automatically initiate an order for replenishment of oil reservoirs or coupling of one or more additional oil reservoirs. Depending upon the volume and context, one or more reservoirs may be ordered with one or more types of frying oils while other reservoirs with other types of frying oils may be of sufficient volume or inventory that the system 120 does not trigger an order for such frying oils. Likewise, as mentioned above, the system 120 can trigger a communication for the pick-up of discarded oil (e.g., waste oil 106). The system 120 can also track attributes of the discarded oil for potential waste oil value capture.

The system 100 topology facilitates data capture and preparation of data analytics in support of tracking or reporting. For example, a reporting capability of the data processing system 120 (or clients of such a system) facilitates generation of reports on various performance attributes of the frying system representative of specific activities or overall summaries The following are examples of performance attributes and reporting metrics that may be provided, but are merely examples and not limiting as to the reporting capabilities of the present subject matter: cost savings, quality control, food uniformity, food-to-oil ratio, oil blend use, oil blend historical data, proactive planning, fryer specific reports, store comparison to other stores, region or brand comparisons, system wide or global reports, aggregate industry data of peers, comparison of metrics corresponding to different oil providers, customer segmentation, oil discard points, volume of used oil, volume of discarded oil, used oil credits, interconnected data processing systems between frying locations serviced through a central warehouse or distribution system, or other parameters.

Figure 2:
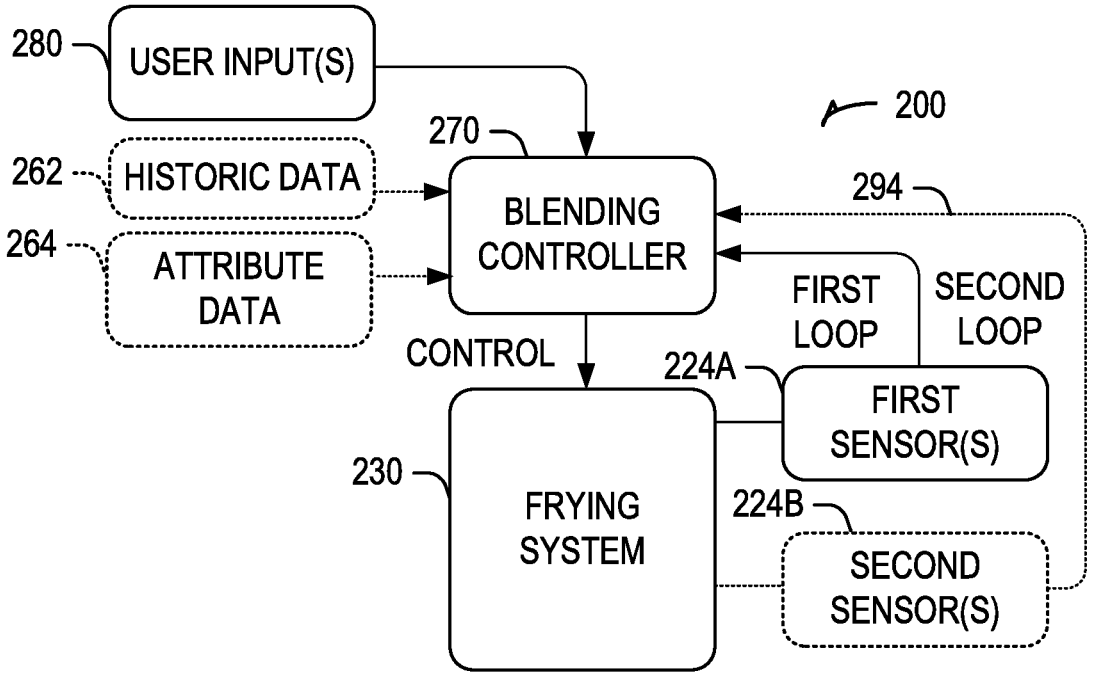
FIG. 2 illustrates generally an example comprising a control scheme such as for use in managing edible oil used in frying operations, and particularly, for managing blending of edible oils such as at a point-of-use.

FIG. 2 illustrates generally an example comprising a control scheme 200 such as for use in managing edible oil used in frying operations, and particularly, for managing blending of edible oils such as at a point-of-use. The present inventors have recognized that open-loop schemes or "go/no-go" monitoring as mentioned above may present various challenges, such as leading to inconsistent frying quality, or inefficient utilization or management of edible oil inventory. For example, an open-loop scheme may result in unnecessary waste where oil replacement is initiated more frequently than is necessary given regulatory or food-quality constraints (e.g., an overly-conservative scheme). In another example, an open-loop scheme may result in inconsistency because the edible oil goes through a wider progression of the degradation spectrum spanning a range of quality from new (e.g., unused) to well beyond an optimum state (e.g., at or near replacement).

Fresh (e.g., unused oil) does not necessarily produce fried food having the highest perceived quality, when such food is evaluated according to more subjective factors such as flavor, aroma, texture (e.g., mouth-feel), or the like. To address various challenges mentioned above, the present inventors have developed an oil blending scheme that can be used to provide closed-loop control of blending of oil from two or more oil sources. Such control can include a first loop operating to provide sensed data of an oil characteristic provided by one or more first sensors 224A. Such sensors 224A can detect an oil characteristic indicative of an oil state, stability, or degradation.

A blending controller 270 (such as included as a portion of a site-wide control system or a controller associated with an individual frying system or group of frying systems) can provide control of the frying system 230, such as shown and described in relation to FIG. 1. For example, such control can include control of one or more valves to dispense new oil into a frying vat, such as controlling one or more valves to provide a specified oil blend defined by volume or mass proportions from two or more respective oil sources. In this manner, the blending controller 270 can establish or maintain frying oil within a desired parameter range. Generally, a target of such blending control can include one or more of cost reduction, food quality optimization, food-specific optimization, cost-quality optimization, frying oil life optimization, volume-specific optimization.

One or more other sensors 224B can provide another control loop, such as sensors providing data indicative of vat level, vat temperature, waste oil reservoir level, oil source level, or other parameters. The blending controller 270 can respond to one or more user inputs 280, such as a manually-selected blend composition, a manual trigger to discharge oil, filter oil, or top-off a frying vat included as a portion of the frying system 230. The blending controller 270 can also establish a specified oil blend in response to historic data 262 such as prior demand patterns, or other attribute data 264. Such historic data 262 can include data indicative of oil or frying demand corresponding to temporal parameters such as a time of day, a time of week, a time of month, a time of year, or a seasonal variation. Such demand can include data indicative of oil volume consumed, oil units consumed (e.g., a count of JIBs), relative or absolute data indicative of types of food prepared corresponding or a count of basket drops (or a proxy for such drops such as temperature variations), corresponding to such temporal parameters. Other attribute or contextual parameters can be used as inputs to the blending controller 270, such as a duration since last oil replacement, a duration since last oil filtration, or a duration since a last fryer cleaning. Other contextual attribute data 264 can include sensing or receiving information indicative of slow times, rush times, anticipated slow times, anticipated rush times, post-rush times, cleaning preparation times, empty vat conditions, low volume vat conditions, or the like, as illustrative examples.

As an illustrative example, the blending controller 270 can operate in a closed-loop fashion to maintain stability of the frying oil in a frying vat of the frying system 230. The one or more first sensors 224A may sense an oil parameter of the frying oil in the frying vat and relate the sensed oil parameter to a stability attribute or determine such a stability attribute value based on the sensed oil parameter. One or more frying oil reservoirs may then be used to create a blend to be delivered to the frying vat in order to maintain a specified stability attribute or to improve such an attribute. One or more first sensors 224A or one or more second sensors 224B can be used to obtain data indicative of attributes of the frying oil in the frying vat or frying oil from one or more frying oil reservoirs.

Figure 3:
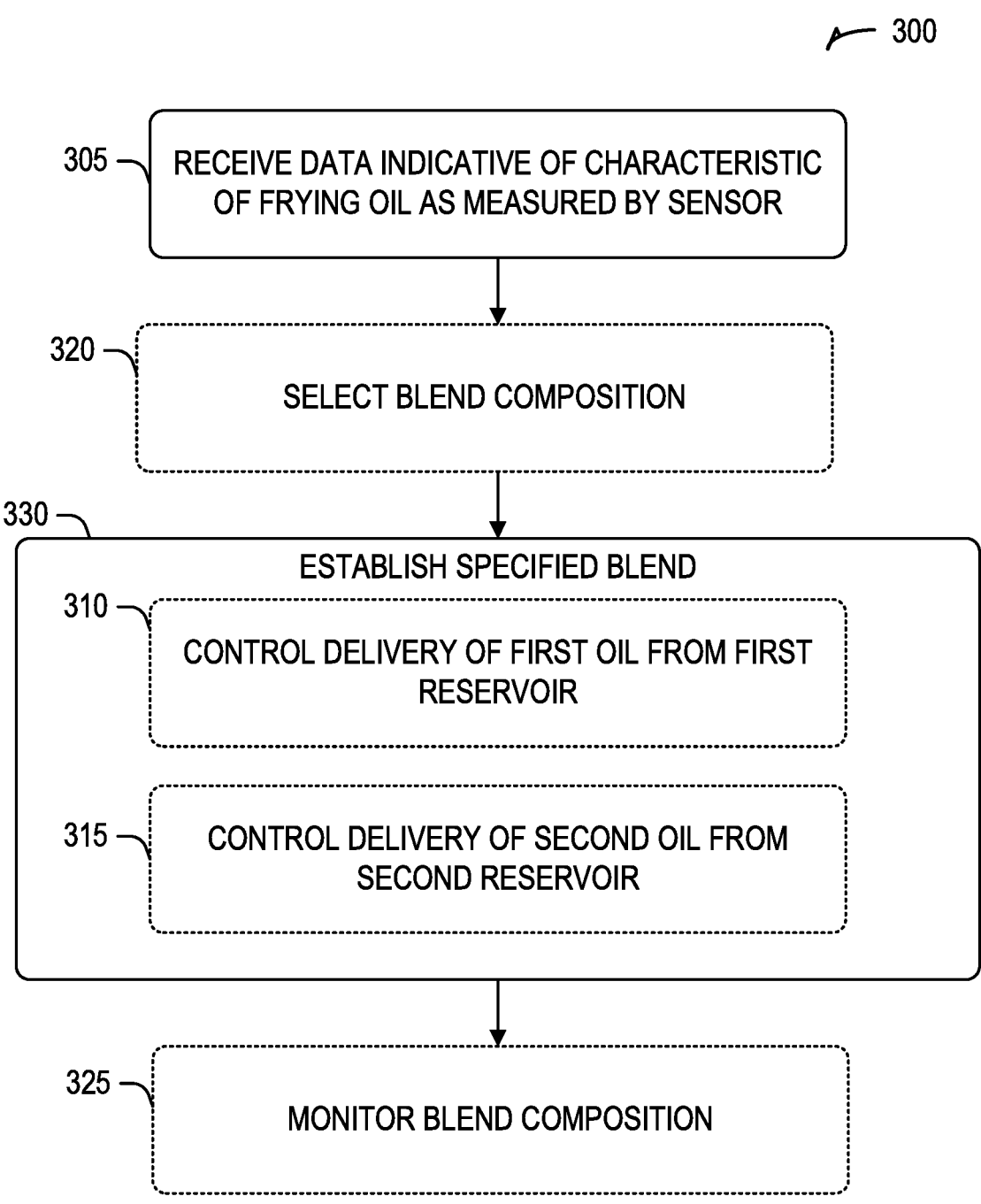
FIG. 3 illustrates generally a technique, such as a method, including receiving data indicative of a characteristic of frying oil as measured by a sensor, and, in response, establishing a specified blend of frying oils, such as at a point-of-use.

FIG. 3 illustrates generally a technique 300, such as a method, including receiving data indicative of a characteristic of frying oil as measured by a sensor at 305, and, in response, at 330 establishing a specified blend of frying oils, such as at a point-of-use. The technique 300 can be automatic or specified tasks can be automated such as operations relating to acquiring the data indicative of the characteristic of the frying oil. Generally, the technique 300 can include use of a scheme 200 as shown in FIG. 2, such as in relation to a system 100 as shown in FIG. 1 or variations thereof. The sensor can include a sensor as described in relation to examples mentioned elsewhere. Optionally, the method can include receiving a selection of an oil blend composition or automatically selecting a blend composition at 320, such as in response to one or more criteria as mentioned above in relation to the control scheme 200 of FIG. 2 (e.g., in response to sensed information, user input, historic data, or other attribute data indicative of a context of use of a frying system).

At 330, establishing the specified blend can include one or more of controlling delivery at 310 of a first oil from a first reservoir (e.g., fed by one or more JIBs), or controlling delivery at 315 of a second oil from a second reservoir (e.g., fed by one or more other JIBs). The first and second oils can be different. Controlling delivery of oil can include opening or closing one or more valves, partially opening one or more valves, or controlling a duration over which one or more valves are open. Optionally, at 325, a composition of an oil blend can be monitored using a sensor similar to the sensor used at 305 or including a different sensor type. Such monitoring can be used to facilitate control of blending or to acquire data for use in other aspects of the system such as reporting or replenishment. As an illustrative example, the technique 300 can be used to facilitate top-off or dispense of oil to a frying oil vat in a frying system. As the frying oil in a frying oil vat is used to cook food products, a portion of the frying oil volume is removed with the cooked food resulting in a loss of frying oil volume. A top-off can be performed to restore the oil volume, with the top-off provided from one or more of oil reservoirs. The present subject matter can include a volume or mass sensing system that can be used at least in part to automatically trigger a top-off. A control scheme can include triggering or controlling a top-off operation resulting in a specified volume of a specified oil blend to be added to a frying vat. The specified oil blend may be selected in response to one or more sensed parameters or other attribute data as discussed in relation to other examples herein.

Figure 4:
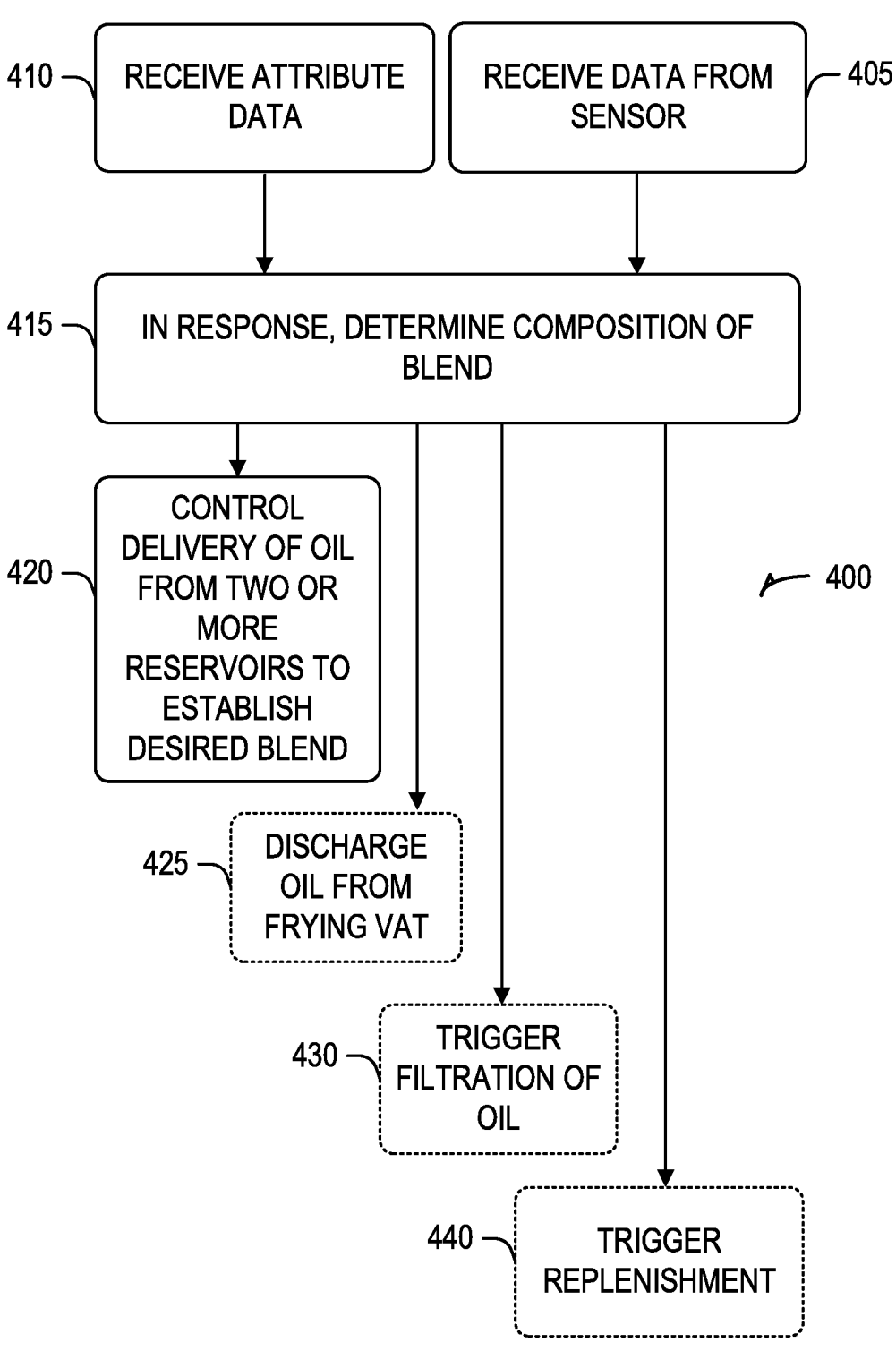
FIG. 4 illustrates generally a technique, such as a method, including receiving data indicative of a characteristic of frying oil as measured by a sensor, receiving attribute data, and, in response, determining a composition of a blend of frying oils.

FIG. 4 illustrates generally a technique 400, such as a method, including receiving data indicative of a characteristic of frying oil as measured by a sensor at 405, receiving attribute data at 410, and, in response, determining a composition of a blend of frying oils at 415. Attribute data can include other sensed information such as a count of basket drops, visual imaging systems observing color development, floating particulates, frequency of cleaning oil surface, or other contextual information relating to the frying operation, as shown and described in relation to other examples herein. At 415, in response to one or more of the received data obtained at 405 or the attribute data received at 410, a specified oil blend composition can be determined (e.g., established on-the-fly or selected from amongst pre-determined options). At 420, the determined blend composition can be used to control delivery of oil from two or more reservoirs to establish a desired oil blend. The desired blend can be specified in terms of a characteristic of an oil in the oil vat, or a characteristic of a blend from a manifold or blending reservoir prior to mixing with oil in the oil vat. A specified blend composition can be established or maintained using other operations, such as discharging oil from a frying vat at 425, triggering a filtration of oil at 430, or to trigger replenishment of oil reservoirs (e.g., JIBs or other containers) at 440.

Figure 5:
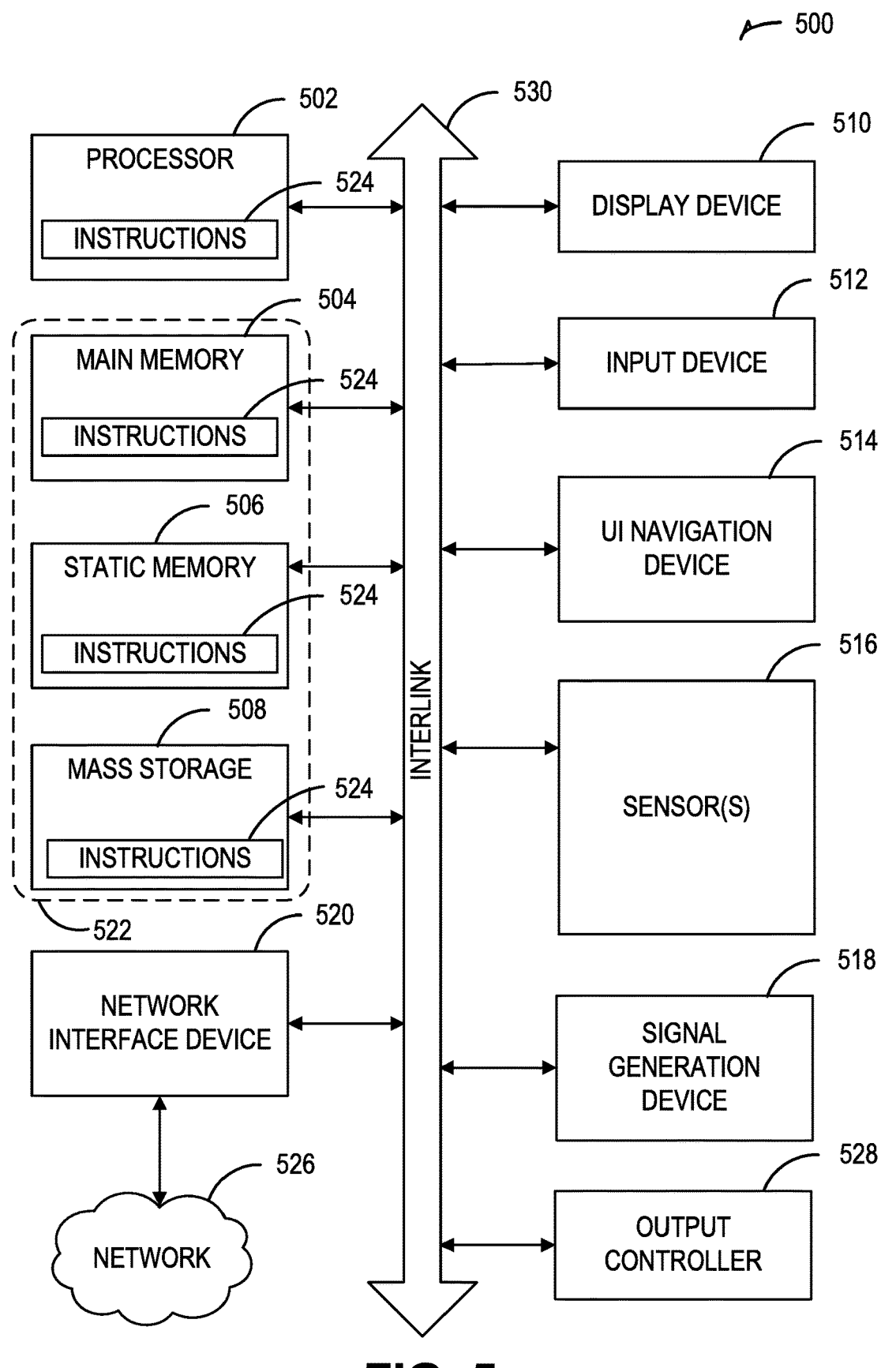
FIG. 5 illustrates a block diagram of an example comprising a machine upon which any one or more of the techniques (e.g., methodologies) discussed herein may be performed.

FIG. 5 illustrates a block diagram of an example comprising a machine 500 upon which any one or more of the techniques (e.g., methodologies) discussed herein may be performed, such as the controller 102 of FIG. 1, the data processing system 120 of FIG. 1, or the blending controller of 270 of FIG. 2. The machine 500 may be included as a portion of elements shown in the system 100 of FIG. 1. In various examples, the machine 500 may operate as a stand-alone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet device, a personal digital assistant (PDA), a mobile telephone, a web appliance, a network router, switch or bridge, a portable (e.g., hand-held) spectrometer such as including a microprocessor or microcontroller, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. "Circuitry" refers generally a collection of circuits implemented in tangible entities that include hardware (e.g., simple circuits, gates, logic elements, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation.

In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks such as conforming to one or more standards such as a 4G or 5G standard or Long Term Evolution (LTE)), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks. among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Various Notes

Each of the non-limiting aspects described herein may stand on its own, or may be combined in various permutations or combinations with one or more of the other aspects or other subject matter described in this document.

The above detailed description includes references to the accompanying drawings, which form a part of the detailed description. The drawings show, by way of illustration, specific embodiments in which the invention may be practiced. These embodiments are also referred to generally as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following enumerated aspects, the terms "including" and "comprising" are open-ended, that is, a system, device, article, composition, formulation, or process that includes elements in addition to those listed after such a term in an enumerated aspect are still deemed to fall within the scope of that claim. Moreover, in the following enumerated aspect, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following aspects are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended enumerated aspects, along with the full scope of equivalents to which such aspects are entitled.

The invention claimed is:

1. A frying oil system, comprising:
   a frying vat having a frying oil contained within the frying vat;
   a plurality of frying oil reservoirs including at least a first frying oil in a first frying oil reservoir and a second frying oil in a second frying oil reservoir, each of the plurality of frying oil reservoirs capable of selectively delivering the frying oil to the frying vat;
   a sensor configured to monitor one or more oil characteristics of the frying oil in the frying vat; and
   a control system configured to:
      receive sensing information from the sensor and, based at least upon the sensing information, determine a desired oil blend of the first frying oil and the second frying oil to be added to the frying vat, and
      selectively deliver the desired blend of the first frying oil from the first frying oil reservoir and the second frying oil from the second frying oil reservoir to the frying vat;
      wherein the control system is located on-site and shared amongst multiple frying vats, and the control system is configured to establish respective blends amongst the multiple frying vats; and wherein the respective blends are established at least in part in response to received data indicative of at least one attribute from a list including a time of day, a time of week, a time of month, a time of year, a duration since last oil replacement, a duration since last oil filtration, or a duration since a last fryer cleaning.

2. The frying oil system of claim 1, wherein the control system is separate from the frying vat.

3. The frying oil system of claim 1, wherein the respective blends include at least two different blends.

4. The frying oil system of claim 1, comprising another sensor to measure a characteristic of the blend from a blending apparatus.

5. A method for controlling delivery of edible oil from a plurality of frying oil reservoirs to a frying vat, the frying vat having a frying oil contained within the frying vat, and the plurality of frying oil reservoirs including at least a first frying oil in a first frying oil reservoir and a second frying oil in a second frying oil reservoir, each of the plurality of frying oil reservoirs capable of selectively delivering the frying oil to the frying vat,
   the method comprising:
   receiving sensing information as measured by a sensor monitoring one or more oil characteristics of the frying oil in the frying vat;
   in response to receiving the sensing information from the sensor and, based at least upon the sensing information, determining a desired oil blend of the first frying oil and the second frying oil to be added to the frying vat, and selectively delivering the desired blend of the first frying oil from the first frying oil reservoir and the second frying oil from the second frying oil reservoir to the frying vat to adjust a characteristic using the first frying oil and the second frying oil to establish a specified blend by a control system;

wherein the control system is located on-site and shared amongst multiple frying vats, and the control system is configured to establish respective blends amongst the multiple frying vats; and wherein controlling delivery of the first frying oil and the second frying oil includes determining a composition of the blend in response to at least on attribute from a list including a time of day, a time of week, a time of month, a time of year, a duration since last oil replacement, a duration since last oil filtration, or a duration since a last fryer cleaning.

6. The method of claim 5, comprising sensing information relating to one or more attributes of the frying oil in the frying vat after delivery of at least one of the first frying oil from the first frying oil reservoir or the second frying oil from the second frying oil reservoir.

7. The method of claim 5, comprising sensing information relating to one or more attributes of a blend of the first frying oil from the first frying oil reservoir and the second frying oil from the second frying oil reservoir.

8. The method of claim 7, wherein the sensing information relating to one or more attributes of the blend includes measuring a characteristic of the blend from a blending apparatus.

9. The method of claim 7, wherein the sensor used to monitor a characteristic of the frying oil in the frying vat is separate from a sensor used to monitor the characteristic of the blend from a blending apparatus.

10. The method of claim 5, wherein controlling selectively delivery of the first frying oil from the first frying oil reservoir amongst the plurality of frying oil reservoirs and controlling delivery of the second frying oil from the second frying oil reservoir amongst the plurality of frying oil reservoirs to adjust the characteristic includes receiving an input from a user.

11. The method of claim 10, wherein the input from the user includes an input triggering a top-off of the frying vat.

12. The method of claim 10, wherein the input from the user includes an input triggering a discharge of edible oil from the frying vat.

13. The method of claim 10, wherein the input from the user includes an input selecting a type of food to be fried; and wherein controlling the delivery of the first frying oil and controlling delivery of the second frying oil includes selecting a blend composition corresponding to the selected type of food.

14. The method of claim 5, wherein controlling delivery of first frying oil from the first frying oil reservoir amongst the plurality of frying oil reservoirs and controlling delivery of the second frying oil from a second frying oil reservoir amongst the plurality of frying oil reservoirs to adjust the characteristic includes automatically triggering delivery of at least one of the first frying oil or the second frying oil to the frying vat.

15. The method of claim 5, wherein controlling delivery of the first frying oil and the second frying oil includes determining a composition of the blend in response to at least on attribute from a list including a temperature, a count of basket drops, or a count of filtration operations.

16. The method of claim 5, comprising discharging oil from the frying vat at least in part in response to the sensing information relating to one or more attributes.

*    *    *    *    *